Figure 1:
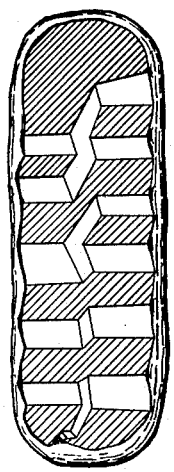

Jan. 4, 1938.  A. GYSI  2,104,459
ARTIFICIAL TEETH
Filed Jan. 14, 1936  3 Sheets-Sheet 1

INVENTOR
ALFRED GYSI
BY
ATTORNEY

Jan. 4, 1938.  A. GYSI  2,104,459
ARTIFICIAL TEETH
Filed Jan. 14, 1936   3 Sheets-Sheet 2

INVENTOR
ALFRED GYSI
BY T. B. Humphries
ATTORNEY

Jan. 4, 1938.  A. GYSI  2,104,459
ARTIFICIAL TEETH
Filed Jan. 14, 1936  3 Sheets-Sheet 3

INVENTOR
ALFRED GYSI
BY
ATTORNEY

UNITED STATES PATENT OFFICE 2,104,459

ARTIFICIAL TEETH

Alfred Gysi, Zurich, Switzerland, assignor to The Dentists' Supply Company of New York, New York, N. Y., a corporation of New York Application January 14, 1936, Serial No. 59,023

6 Claims. (Cl. 32—8)

This invention relates to artificial teeth, more particularly to posterior teeth, and has special reference to the carving of the occlusal surfaces whereby the teeth have such anatomical character as to facilitate in normal mandibular movements.

Because of the varying inclinations of the condyles of humans, it has been difficult at times to arrange artificial teeth in a way that would avoid displacement of dentures because of steep cusp angulations, which produced forces in direction detrimental to retention of dentures, and the primary object of this invention is, therefore, to reduce as far as possible all such unfavorable forces.

A further object of the invention is to produce teeth whose occlusal surfaces are so arranged that efficient mastication is inherent.

Another object of this invention is to so carve the occlusal surfaces of teeth, retaining their anatomical efficiency, wherein the cusp heights are reduced, thereby minimizing the possibility of forces which cause dislodgement of the denture.

A further object of the invention is to provide teeth still retaining anatomical relation, upper and lower, and in which the facet angulations are reduced for the purpose of more efficiently distributing the forces exerted during the movements of mastication.

A further object of this invention is to so carve the occlusal surfaces of teeth that they will have as units a larger range of usefulness in the dental field.

In my United States Letters Patent No. 1,665,357, dated April 10, 1928, I have explained the method and means for producing primordial forms from which the occlusal surfaces of artificial teeth may be obtained. In that patent, average mandibular movements were assumed and the resultant teeth had their angulations in harmony with these movements.

In my Patent No. 2,050,837, granted August 11, 1936, I have explained the carving of the occlusal surfaces to produce more efficient tool-like characteristics.

In extensive research work, I have discovered that by the lowering of the cusp inclinations progressively, posteriorly-anteriorly, great benefit can be gained.

In the carving of the primordial forms, the articulator referred to in the patent above mentioned was used with the so-called sharks teeth, being influenced in its various movements of carving by an average condyle inclination and an incisal table inclination that was in harmony with natural teeth. We have found in our research that wherein natural teeth would function efficiently with steeper inclinations, that by reducing the inclination progressively from molars to incisors a greater efficiency for artificial teeth was obtained.

According to the invention, the primordial form is so carved that the various vital facets progressively decrease in angulation, posteriorly-anteriorly, and correspondingly the lateral facet angulations are reduced in harmony therewith.

Figure 6:
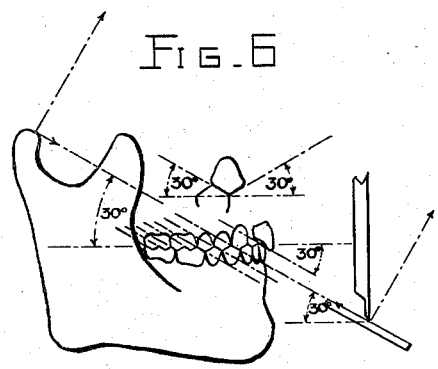
Figure 7:
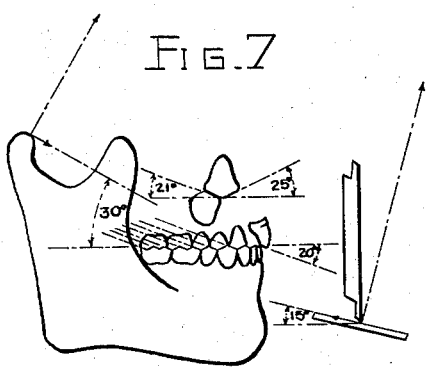
Figure 8:
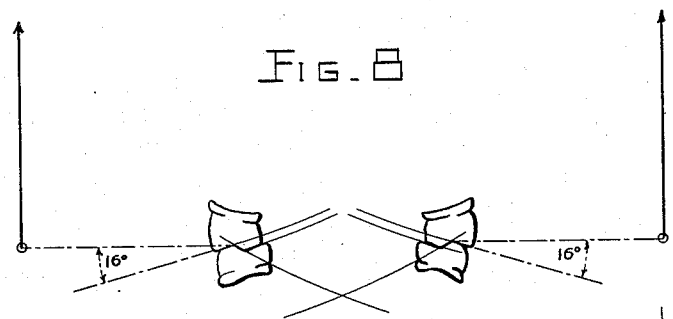
Figure 9:
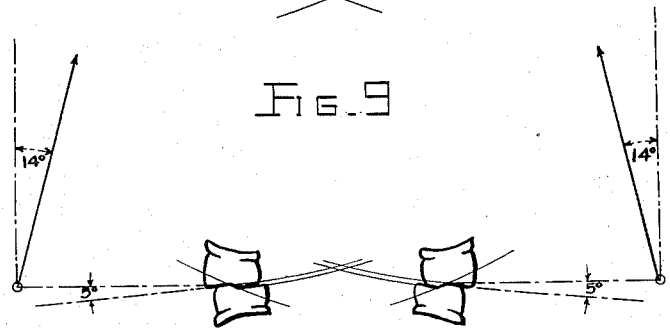
Figure 10:
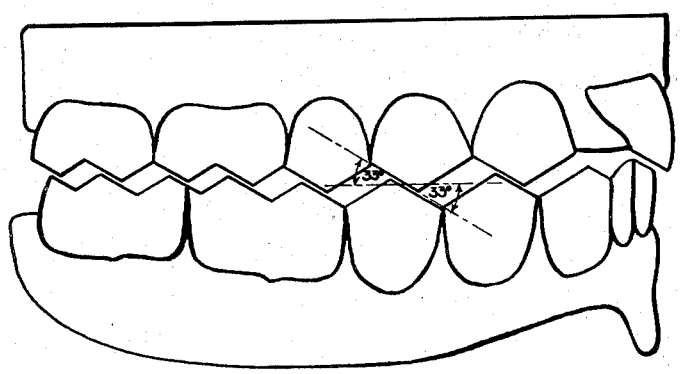
Figure 11:
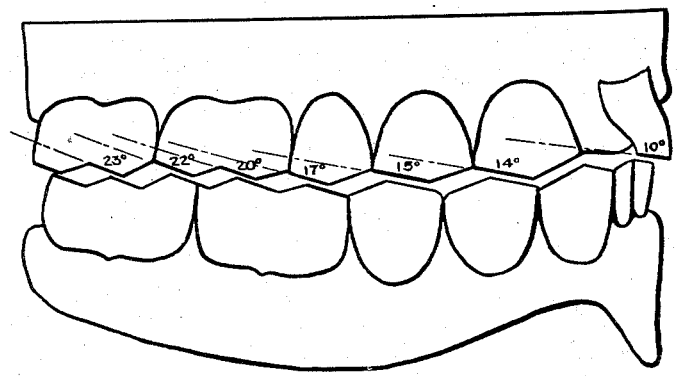
Figures 12, 13, 14, 15:
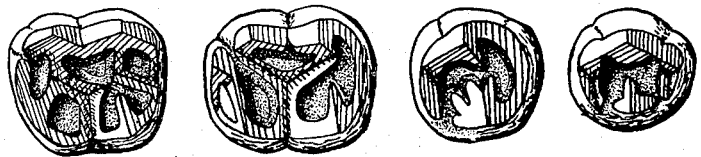

The drawings illustrate an embodiment of the invention and the views therein are as follows:

Fig. 1 is a top plan view of a primordial form carved in accordance with the invention, Figs. 2 to 7, inclusive, show side views of the human mandible and illustrate the influence on the protrusive facet angles of various condyle angles with different incisal table angles, Figs. 8 and 9 are diagrammatic views and illustrate the effect on the lateral facet angles by retaining the condyle angle and changing the incisal table angle, Fig. 10 is a side view of the mandible showing protrusive facets of the teeth and in which the angle of the condyle path and the incisal table angle are equal, Fig. 11 is a like view showing the decreasing angulation of the facets, posteriorly-anteriorly, when the angle of the condyle path has been retained as in Fig. 10 and the incisal table angle lowered, and Figs. 12 to 15, inclusive, show a posterior tooth row wherein the facets have their angles decreasing posteriorly-anteriorly, and wherein reliefs have been cut in the facet faces while retaining substantially the perimeters thereof, thus leaving the original meeting edges of the facets and thereby retaining the angulations of the primordial form.

My first mentioned patent assumed that the average condyle inclination was 33 degrees and the incisal table was set at a corresponding angle which produced facets of equivalent inclinations. My present invention still retains from a working standpoint the 33 degree condyle, but it is understood that this means of carving could be arranged to accommodate any inclination of condyle. I do, however, because of the findings of my research work, promote the idea of setting the incisal table on the carving instrument at a lowered angle relative to the chosen condyle inclination, thereby reducing the facet angulations progressively from molars through incisors.

Figure 2:
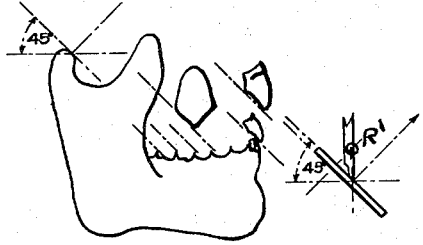

In the drawings, Fig. 2 as shown depicts a mandible in which the condyle inclination is 45 degrees and in which the incisal table has been set at that same angle. Perpendiculars erected from these control inclinations will extend into infinity, being parallel to each other. Therefore, all protrusive facets of the primordial form influenced by these angles will be of corresponding inclination. If, therefore, the articulator of my patent first aforementioned were set at these angles, the anterior-posterior facet inclinations influenced by these controls would be 45 degrees.

Figure 3:
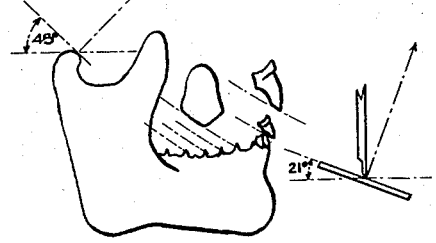

Referring to Fig 3, we have illustrated a similar condyle movement of 45 degrees, but we have lowered the incisal table to 21 degrees. Perpendiculars erected in the same manner from the two control inclinations intersect at the point R. Taking this intersecting point as the rotation center, the facet inclinations are determined by the arcs that will be swung from this common rotation center. It will be noted that by using this lowered incisal table, the facet inclinations have been decreased over the facet inclinations of Fig. 2, and they decrease in angulation posteriorly-anteriorly.

Figure 4:
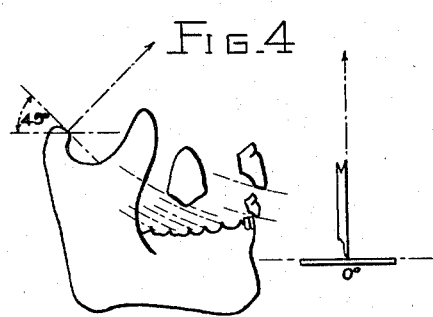

Referring now to Fig. 4, the condyle angle of 45 degrees has been retained, but the incisal table has been set at zero. Perpendiculars erected in the same manner meet at the point R' and at far less distance from the control areas than in the previous figure, and the rotation center is correspondingly moved more perpendicular to the tooth row. Consequently, arcs swung in the tooth row neighborhood are flatter than arcs turned out of the rotation center of Fig. 3.

Figure 5:
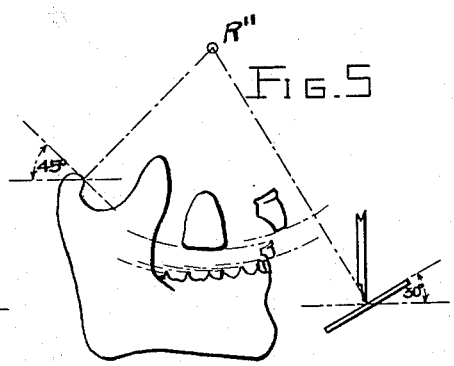

Referring now to Fig. 5, wherein the condyle control has been retained at 45 degrees and the incisal table has been set at minus 30 degrees, the rotation center R'' from which the arcs are swung results in teeth of which the occlusal surfaces are practically flat. This, of course, neglects the fact that the surfaces are arcs since the surface is so small that the facet faces may be considered as chords of these small arcs. This, of course, applies in each case.

Fig. 6, akin to Fig. 2, shows the condyle inclination and the incisal table inclination set at 30 degrees. Here again, perpendiculars erected from the control surfaces are parallel and extend to infinity, and again we have the protrusive facet inclinations influenced by these controls so that they are carved at 30 degrees.

Fig. 7 shows the influence on the facet angulation obtained by lowering of the incisal table. Perpendiculars erected from these control areas give a different rotation center, such as illustrated in Figs. 3, 4, and 5, and result in a corresponding lowering of the protrusive facet inclinations to the occlusal plane posteriorly-anteriorly.

Our research investigations have resulted in certain definite findings which indicate that the lateral movements of the mandible are also lowered under the influence of the lowering of this incisal table. Consequently, all vital facets whether they are slopes inclined laterally or anteriorly come within the influence of this principle, and in the present case are intended to be successively lowered in the same direction as the angulation of the facets.

Figs. 8 and 9, complementary to Figs. 6 and 7, show the influence of the incisal table setting upon the lateral facet inclinations. These inclinations have been obtained geometrically, and Fig. 8 indicates the lateral facet inclination with sagittal inclination of 30 degrees and an incisal table angulation of 30 degrees, while Fig. 9 is intended to illustrate the lowering of the lateral facet inclination while retaining the sagittal condyle inclination at 30 degrees and lowering the incisal table to an angulation of 15 degrees.

Fig. 10 is a buccal view of a tooth row wherein the facets are carved under the influence of the 33 degree condyle and 33 degree incisal table, whereas Fig. 11 shows a tooth row carved in accordance with this invention and wherein the condyle inclination is retained at 33 degrees while the incisal table inclination has been lowered.

In Fig. 10, all protrusive facets on each tooth retain the 33 degree angle to the occlusal plane while in Fig. 11 the angulations of the protrusive facets progressively decreases to the occlusal plane posteriorly-anteriorly. In this latter figure, we have given the angulations of the protrusive facets of the upper denture only, but of course it will be understood that the angulations of the teeth in the lower denture are complementary. It will be noted that while the protrusive facet angulations decrease posteriorly-anteriorly in Fig. 11, the cusp heights decrease in the opposite direction, i. e. anteriorly-posteriorly.

Referring now again to Figs. 8 and 9, it follows that by lowering the protrusive facet angulations as in Fig. 11, the lateral angulations have been relatively lowered.

Figs. 12 to 15 illustrate the carving of the occlusal surfaces of teeth in which the facets have been cut according to this invention and in which these facets have been carved according to my Patent No. 2,050,837, granted August 11, 1936.

Of course, in the practical use of teeth, it will be found that various combinations of angulation will in certain given cases produce the desired results. Consequently, we do not limit ourselves to any definite angles but claim all modifications and arrangements of facet inclinations which fall within the scope of the appended claims.

The invention is hereby claimed as follows:

1. A posterior tooth having multiple protrusive facets and in which the protrusive posterior facet has greater angulation than the anterior protrusive facet, and in which the working and balancing facets have their angulations successfully lowered in the same direction.

2. A tooth row consisting of bicuspids and molars, and in which the protrusive facets decrease in angulation to a given occlusal plane from second molar to first bicuspid, and in which the working and balancing facets of the teeth have their angulations successively lowered in the same direction.

3. A posterior tooth having multiple protrusive facets and cusps in which the posterior protrusive facets have greater angulations to a given occlusal plane than have the anterior protrusive facets, and in which the anterior cusps have greater height than the posterior cusps.

4. A tooth row consisting of bicuspids and molars having multiple protrusive facets and cusps, and in which the angulations of said protrusive facets to a given occlusal plane decrease while the cusp heights increase posteriorly-anteriorly.

5. A posterior tooth having multiple protrusive facets and cusps in which the posterior protrusive facets have greater angulations to a given occlusal plane than have the anterior protrusive facets, and in which the anterior cusps have greater height than the posterior cusps, and in which the working and balancing facets and cusps are lowered in like directions.

6. A tooth row consisting of bicuspids and molars having multiple protrusive facets and cusps, and in which the angulations of said protrusive facets to a given occlusal plane decrease while the cusp heights increase posteriorly-anteriorly, and in which the lateral facets and cusps are lowered in the same directions.

ALFRED GYSI.